United States Patent
Krishnaswamy

(10) Patent No.: US 8,935,436 B2
(45) Date of Patent: Jan. 13, 2015

(54) WAKEUP TRIGGER TO SUPPORT MULTIPLE USER INTERFACES, ENVIRONMENTS, AND/OR VIRTUAL MACHINES

(75) Inventor: Dilip Krishnaswamy, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 80 days.

(21) Appl. No.: 12/372,916

(22) Filed: Feb. 18, 2009

(65) Prior Publication Data

US 2010/0211698 A1 Aug. 19, 2010

(51) Int. Cl.
G06F 3/00 (2006.01)
H04W 4/00 (2009.01)
H04W 8/00 (2009.01)
H04W 84/18 (2009.01)
H04M 1/725 (2006.01)

(52) U.S. Cl.
CPC .............. *H04W 4/003* (2013.01); *H04W 4/008* (2013.01); *H04W 8/005* (2013.01); *H04W 84/18* (2013.01); *H04M 1/7253* (2013.01)
USPC ........................................................ 710/11

(58) Field of Classification Search
CPC ......................................................... G06F 3/01
USPC ................................................................ 710/11
See application file for complete search history.

(56) References Cited

U.S. PATENT DOCUMENTS

| | | | | |
|---|---|---|---|---|
| 5,933,478 A * | 8/1999 | Ozaki et al. | ................. | 379/93.24 |
| 6,154,787 A | 11/2000 | Urevig et al. | | |
| 6,331,825 B1 * | 12/2001 | Ladner et al. | ................. | 340/988 |
| 6,503,147 B1 | 1/2003 | Stockdale et al. | | |
| 6,665,740 B1 * | 12/2003 | Mason et al. | ..................... | 710/6 |
| 8,135,342 B1 * | 3/2012 | Harold | .......................... | 455/41.1 |
| 8,542,834 B1 * | 9/2013 | Feikis et al. | .................. | 380/270 |
| 2003/0050963 A1 | 3/2003 | Lamming et al. | | |
| 2004/0093109 A1 * | 5/2004 | O'Connor et al. | ............ | 700/117 |
| 2008/0004075 A1 | 1/2008 | Horton | | |

(Continued)

FOREIGN PATENT DOCUMENTS

| CN | 101252376 A | 8/2008 |
|---|---|---|
| CN | 101305547 A | 11/2008 |

(Continued)

OTHER PUBLICATIONS

Taiwan Search Report—TW098112232—TIPO—Apr. 23, 2012.

(Continued)

*Primary Examiner* — Henry Tsai
*Assistant Examiner* — Juanito Borromeo

(57) ABSTRACT

Detection of remote computing devices triggers a wakeup signal that subsequently activates a remote computing environment. The remote computing environment can be utilized at substantially the same time as a local computing environment or at a different time. A list of available remote peripheral devices can be gathered automatically and/or based on a user request. One or more of the peripheral devices can be chosen by the user and/or chosen automatically based on various criteria. After selection of one or more devices, a wakeup trigger is sent to activate a remote computing environment that includes the one or more devices. The remote computing environment can be monitored and if the devices are no longer available, deactivation of the remote computing environment is performed automatically.

34 Claims, 9 Drawing Sheets

(56) References Cited

U.S. PATENT DOCUMENTS

| | | | |
|---|---|---|---|
| 2008/0008313 A1 | 1/2008 | Fyke | |
| 2008/0177550 A1* | 7/2008 | Mumm et al. | 704/273 |
| 2008/0279161 A1 | 11/2008 | Stirbu et al. | |
| 2009/0061769 A1* | 3/2009 | Zimbric et al. | 455/41.2 |
| 2009/0285132 A1* | 11/2009 | Hsueh et al. | 370/271 |
| 2010/0082782 A1* | 4/2010 | Ding | 709/222 |

FOREIGN PATENT DOCUMENTS

| | | |
|---|---|---|
| JP | 2000163361 A | 6/2000 |
| JP | 2003196076 A | 7/2003 |
| JP | 2003196096 A | 7/2003 |
| JP | 2003280778 | 10/2003 |
| JP | 2006185251 A | 7/2006 |
| JP | 2006268536 A | 10/2006 |
| JP | 2007129342 A | 5/2007 |
| JP | 2008269177 A | 11/2008 |
| WO | WO-2007072135 A1 | 6/2007 |

OTHER PUBLICATIONS

International Search Report—PCT/US2009/040398—International Search Authority, European Patent Office, May 27, 2010.

Written Opinion—PCT/US2009/040398—ISA/EPO—May 27, 2010.

* cited by examiner

WAKEUP TRIGGER TO SUPPORT MULTIPLE USER INTERFACES, ENVIRONMENTS, AND/OR VIRTUAL MACHINES

BACKGROUND

I. Field

The following description relates generally to communication environments and more particularly to activating a remote computing network.

II. Background

Mobile communication devices are widely utilized to communicate and for data transfer (e.g. to access the Internet). To retain portability, mobile communication devices have a small footprint and are lightweight and, therefore, a user can carry a device from place to place. In order to conform to the small footprint, and weight reduction requirements, peripheral accessories associated with the device are necessarily small. For example, a display should be small enough to allow a user to carry the device in a pocket while also allowing a numeric keypad, a keyboard, and/or a display to be included on the device.

As advances in technology evolve, users desire to accomplish multiple tasks at the same time. Therefore, users might desire to operate multiple devices at substantially the same time in order to accomplish multiple tasks. However, the ability to utilize multiple devices might not be possible when a user is traveling from place to place, since the user would have to carry the multiple devices.

At times, peripheral accessories included on the device might not be adequate to allow the user to adequately perform various functions with the device. For example, if the user desires to view a movie with the device, the small display can negatively influence the user experience. In another example, if the user needs to utilize the keyboard in order to create a document, usage of the small keyboard can result in discomfort to the user as well as impeding the user input process.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with discovering and activating a remote computing environment. Detection of devices needed for remote computing triggers a wakeup signal on a platform that subsequently activates a remote computing desktop environment. Different virtual machines (such as one for a phone environment and one for a computing environment) can be supported on the platform such that a dormant computing virtual machine is woken up when a wakeup trigger (which can be location-based) is activated in a hypervisor that supports the virtual machines.

An aspect relates to a method for enabling a remote computing environment. The method employs a processor to perform the acts of obtaining a list of available remote peripheral devices and choosing at least one of the available remote peripheral devices. The method also includes activating a remote computing environment that comprises the at least one chosen available remote peripheral device. The local computing environment and the remote computing environment provide different user experiences.

Another aspect relates to a wireless communications apparatus that includes a memory and a processor. The memory retain instructions related to performing local processing, gathering a list of available remote peripheral devices, selecting one or more of the available remote peripheral devices, and enabling a remote computing environment that comprises the selected remote peripheral devices. The local processing and the remote computing environment provide different user experiences. The processor is coupled to the memory and is configured to execute the instructions retained in the memory.

A further aspect relates to a wireless communication apparatus that enables a remote computing environment. The wireless communications apparatus includes means for accessing a list of available remote peripheral devices and means for selecting at least one of the available remote peripheral devices. Also included in wireless communications apparatus is means for enabling a remote computing environment that comprises the at least one chosen available remote peripheral device. Communication apparatus also includes means for operating a local computing environment that provides a user experience that is different than an experience provided by the remote computing environment.

Still another aspect relates to a computer program product comprising a computer-readable medium. The computer-readable medium includes a first set of codes for causing a computer to obtain a list of available remote peripheral devices and a second set of codes for causing the computer to choose at least one of the available remote peripheral devices. The computer-readable medium also includes a third set of codes for causing the computer to activate a remote computing environment that comprises the at least one chosen available remote peripheral device. Further, included in the computer-readable medium is a fourth set of codes for causing the computer to selectively deactivate the remote computing environment based on connectivity of the at least one chosen remote peripheral device.

Yet another aspect relates to at least one processor configured to enable a remote computing environment. The processor includes a first module for obtaining a list of available remote peripheral devices and a second module for choosing at least one of the available remote peripheral devices. Also included in processor is a third module for activating a remote computing environment that comprises the at least one chosen available remote peripheral device and a fourth module for selectively deactivating the remote computing environment if the at least one remote peripheral device is no longer available.

To the accomplishment of the foregoing and related ends, the one or more aspects comprise the features hereinafter fully described and particularly pointed out in the claims. The following description and the annexed drawings set forth in detail, certain illustrative features of the one or more aspects. These features are indicative, however, of but a few of the various ways in which the principles of the various aspects may be employed. Other advantages and novel features will become apparent from the following detailed description when considered in conjunction with the drawings, and the disclosed aspects are intended to include all such aspects and their equivalents.

DETAILED DESCRIPTION

Figure 1:
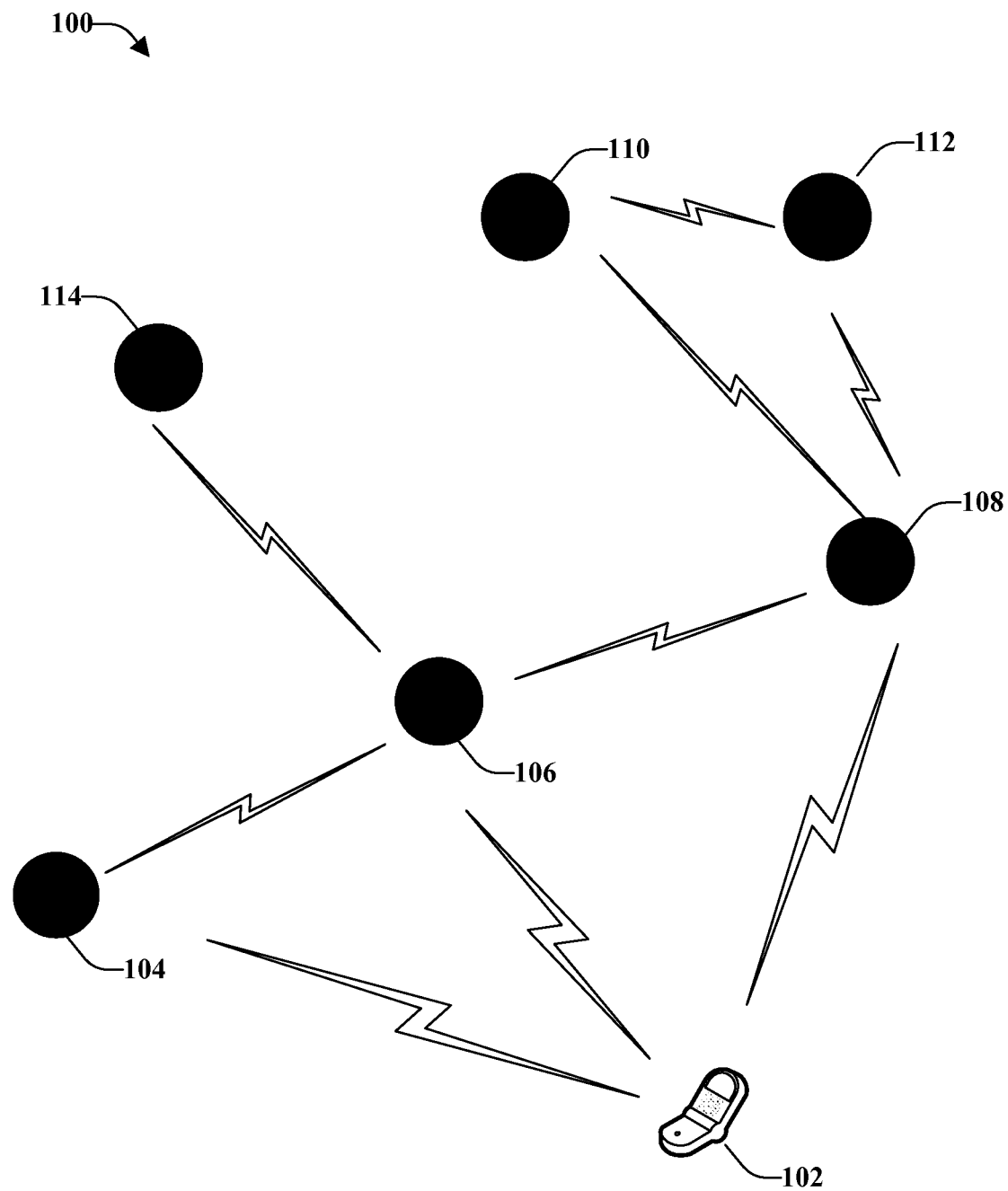
FIG. 1 illustrates a wireless communication network in accordance with various aspects presented herein.

Various aspects are now described with reference to the drawings. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing these aspects.

As used in this application, the terms "component", "module", "system", and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal).

Furthermore, various aspects are described herein in connection with a mobile device. A mobile device can also be called, and may contain some or all of the functionality of a system, subscriber unit, subscriber station, mobile station, mobile, wireless terminal, node, device, remote station, remote terminal, access terminal, user terminal, terminal, wireless communication device, wireless communication apparatus, user agent, user device, or user equipment (UE). A mobile device can be a cellular telephone, a cordless telephone, a Session Initiation Protocol (SIP) phone, a smart phone, a wireless local loop (WLL) station, a personal digital assistant (PDA), a handheld communication device, a handheld computing device, a satellite radio, a wireless modem card and/or another processing device for communicating over a wireless system. Moreover, various aspects are described herein in connection with a base station. A base station may be utilized for communicating with wireless terminal(s) and can also be called, and may contain some or all of the functionality of, an access point, node, Node B, e-NodeB, e-NB, or some other network entity.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

Referring now to FIG. 1, a wireless communication network 100 is illustrated in accordance with various aspects presented herein. Network 100 includes a mobile device 102, illustrated as a mobile phone; however, other mobile communication devices can be utilized with the disclosed aspects. Further, network 100 can include any number of nodes that can be in wired and/or wireless communication with mobile device. Mobile device 102 can be moved in and out of range of these various nodes (e.g., nodes 104, 106, 108, 110, 112, and/or 114), which can be wireless computing peripheral devices, wired computing peripheral devices, and/or a hub to which one or more wireless computing peripheral devices are connected.

The mobile device 102 can detect nodes available for computing and/or for enabling a remote computing environment (e.g., a wireless mouse, wireless keyboard, wireless display, and so forth), such as through a discovery process. The nodes can be detected utilizing a short range radio, such as Ultra-Wide Band Radio Frequency (UWB RF) interfaces (e.g., ECMA-368 or evolving 60 Ghz standard such as ECMA-387, 802.15.3C, 802.11D), 802.15.4 based standards (for all Wi-Fi), BlueTooth®, and so forth. At substantially the same time as discovering one or more nodes (and associated capabilities), a trigger can initiate a wakeup signal on a platform that activates a remote computing environment that utilizes one or more of the discovered nodes. For example, a computing desktop environment on a remote wireless display with wireless internet access can be activated. Different virtual machines (such as one for a phone environment and one for a computing environment) can be supported on the platform such that a dormant computing virtual machine is woken up when the wakeup trigger is activated. Further, a remote computing environment can be enabled while, at substantially the same time, a local computing environment is in a standby mode.

In accordance with some aspects, mobile device 102 can be in communication with a wireless hub (e.g., node 108) that is connected to one or more peripheral devices (e.g. nodes 110 and 112) in a wired and/or wireless configuration. For example, a hub 108 can include support for holographic displays and keyboards. According to some aspects, a node can be a dock (or docking station) that has a wired connection with mobile device 102 and a wired and/or wireless connection with one or more of the peripheral devices (e.g., one or more of nodes 104, 106, 108, 110, 112, and 114).

In a further aspect, mobile device 102 can be connected to one or more nodes (e.g., node 114) through a multi-hop configuration. For example, each node can be within range of one or more other nodes and can communicate with the other nodes or with another node through utilization of the other nodes, such as in a multi-hop topography (e.g., communications can hop from node to node until reaching a final destination). For example, mobile device 102 might desire to connect to node 114. To enable the connection between mobile device 102 and node 114, one or more intermediate nodes (e.g., node 106) can be utilized as a bridge between the mobile device 102 and the node 114.

Each node 104-114 capable of operating as a peripheral device for one or more mobile devices can broadcast its identifier and/or its capabilities. In accordance with some aspects, a node can be exclusively available as a peripheral device to various devices (wired and/or wireless). According to some aspects, a node can be configured as both a peripheral device dedicated for a specific device and, when not in use by the dedicated device, the node can function as a peripheral device for a second (or more) devices. For example, the peripheral device can be a printer connected to a desktop computer. If the printer is not in use by the desktop computer, the printer can allow other devices within the computing environment to utilize the capabilities of the printer.

Figure 2:
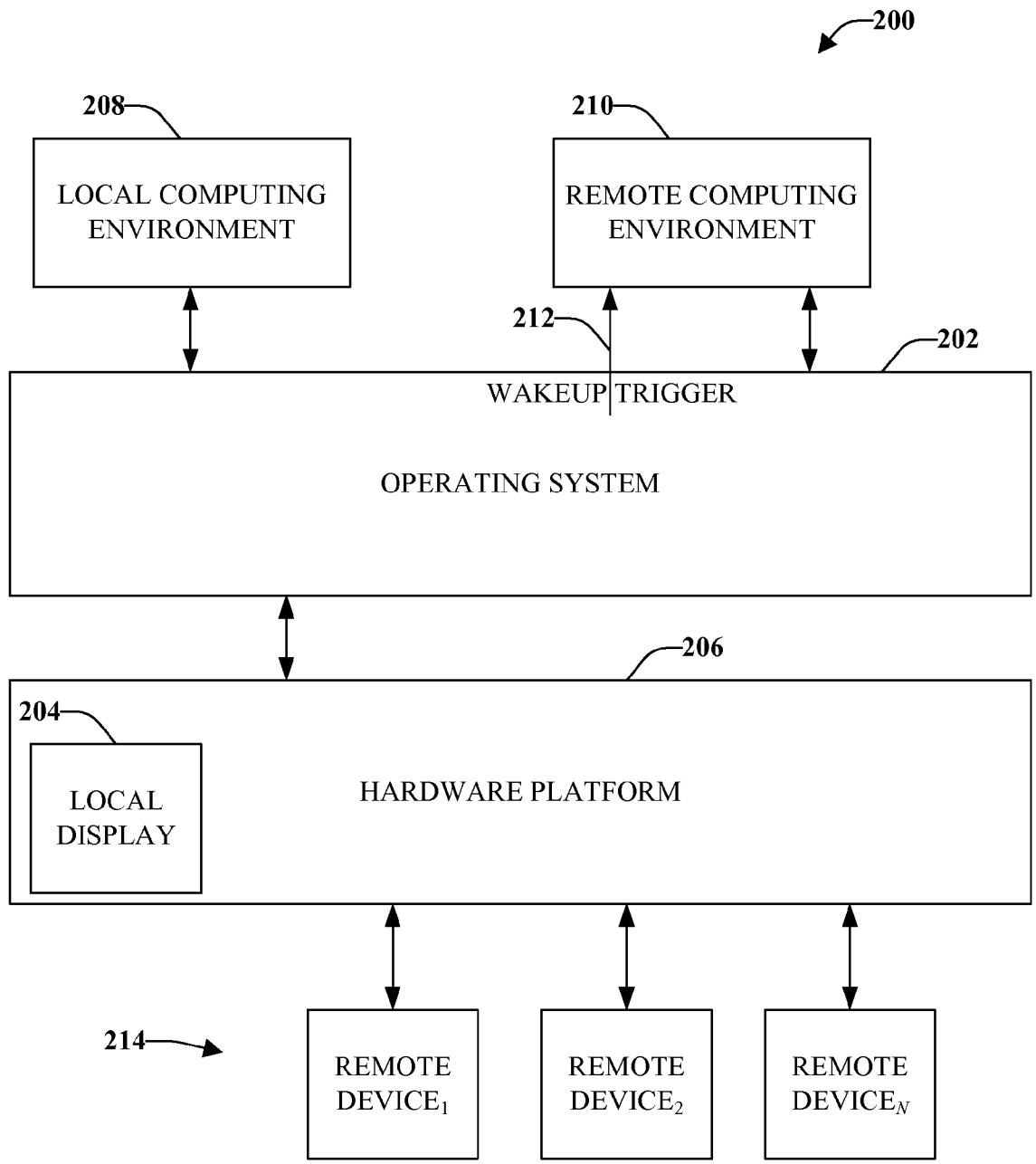
FIG. 2 illustrates an architecture in accordance with one or more of the disclosed aspects.

FIG. 2 illustrates an architecture 200 in accordance with one or more of the disclosed aspects. The architecture 200 can reside at least partially within a user device. The example architecture 200 enables a user (through interaction with the user's mobile device) to walk into an environment where there is a display, a keyboard, a mouse, other computing support devices, peripheral devices, virtual machines, and so forth, and enable remote access to those devices. The mobile device can include a wireless radio that allows communication with other devices (e.g., over a backhaul wireless WAN). According to some aspects, typical functions can be performed on the mobile device (e.g., text messaging and so on) and, when a remote computing environment is enabled, a different function can be performed within that environment at substantially the same time (e.g., data processing functions, watching a video, and so forth). Typically, a mobile device by itself has a very small display and keyboard. Thus, in accordance with some aspects, the user can utilize the mobile device to find traditional (e.g., full-size) computing devices or peripheral devices and communicate with those devices in order to utilize the functionality of those computing devices and to provide a more robust user experience. The functionality of the remote computing devices can be utilized separately and/or at substantially the same time as functions are performed locally on the device.

A mobile device has its own operating system 202, which can run a set of applications. Operating system 202 can be a real-time operating system that can manage communication tasks and a set of applications that are provided for the mobile device environment. For example, operating system 202 can be configured for voice calls, data calls, and so forth. Mobile device can also have a local display 204 associated with a hardware platform 206. Included in hardware platform 206 can be multiple drivers for multiple displays, for example, as well as other components for operation of the device. Hardware platform 206 can be configured to drive a local computing environment 208 and one or more remote computing environments 210 (one of which is shown). The term "remote", "virtual" or the like, is intended to refer to a device (e.g., display and so forth) that is not tightly coupled to the platform or that is separate from the user device. Thus, remote and the like indicates that the platform is driving another computing environment when it discovers peripheral devices and has the ability to drive a second (or more) computing environments (in addition to the local computing environment). Local and remote computing environments 208, 210 can provide different services, and hardware platform 206 is powerful enough to provide support for different applications that can be processed on the different computing environments 208, 210.

Operating system 202 can operate local computing environment 208, which can be operations typically performed on device (e.g., a mobile phone that enables voice calls, data calls, and so forth). Operating system 202 can also activate remote computing environment 210, which can be dormant until a wakeup trigger 212 is received from operating system 202. Wakeup trigger 212 can be activated based on detection of a suitable remote computing environment 210, based on user input, or based on other criteria.

Both local computing environment 208 and remote computing environment 210 can operate at substantially the same time, providing the user with two (or more) simultaneous experiences (one on user device and at least a second on remote computing equipment). In an example, there can be two display screens, one that is local on device (e.g., local computing environment 208) and one that is provided as remote or virtual hardware (e.g., remote computing environment 210). The user can interface with the virtual hardware, such as by browsing the Internet and viewing the results on the virtual display. When a phone call is received on mobile device, the user can talk on the phone while the browsing is still running. Thus, the user can perform multiple tasks, one task on the remote display that has a computing environment (e.g., typing function) and a second task locally on the device (e.g., talking on the phone).

In accordance with some aspects, remote computing environment 210 can be active and local computing environment 208 can be in a standby mode. By "standby mode", it is meant that a minimum set of applications are active. When certain situations arise (e.g., an incoming phone call, a user input, and so on) additional applications become active.

If one or more virtual hardware devices are not found (or are no longer in range), remote computing environment 210 can shut down in order for mobile device to enter a lower energy state. When one or more virtual hardware devices are found, mobile device can enter a higher energy state and activate remote computing environment 210, through wakeup trigger 212.

In accordance with some aspects, activation of remote computing environment 210 can be a function of an automatically activated location-based wakeup trigger 212 and/or through manual activation (e.g., based on a user input). For example, when user device is brought within range of one or more other devices or nodes (e.g., virtual hardware 214 represented as remote device$_1$, remote device$_2$ through remote device$_N$, where N is an integer), remote computing environment 210 can be activated when the user selects one or more of the other devices 214, such as from a list of available devices in the remote computing environment 210. In such a manner, the user can be provided with information regarding remote computing environment 210 and can utilize environment 210, as desired (e.g., through interaction with hardware devices). In accordance with some aspects, activation of remote computing environment 210 can be performed automatically (e.g., as a function of conformance with configurable rules or policies).

Figure 3:
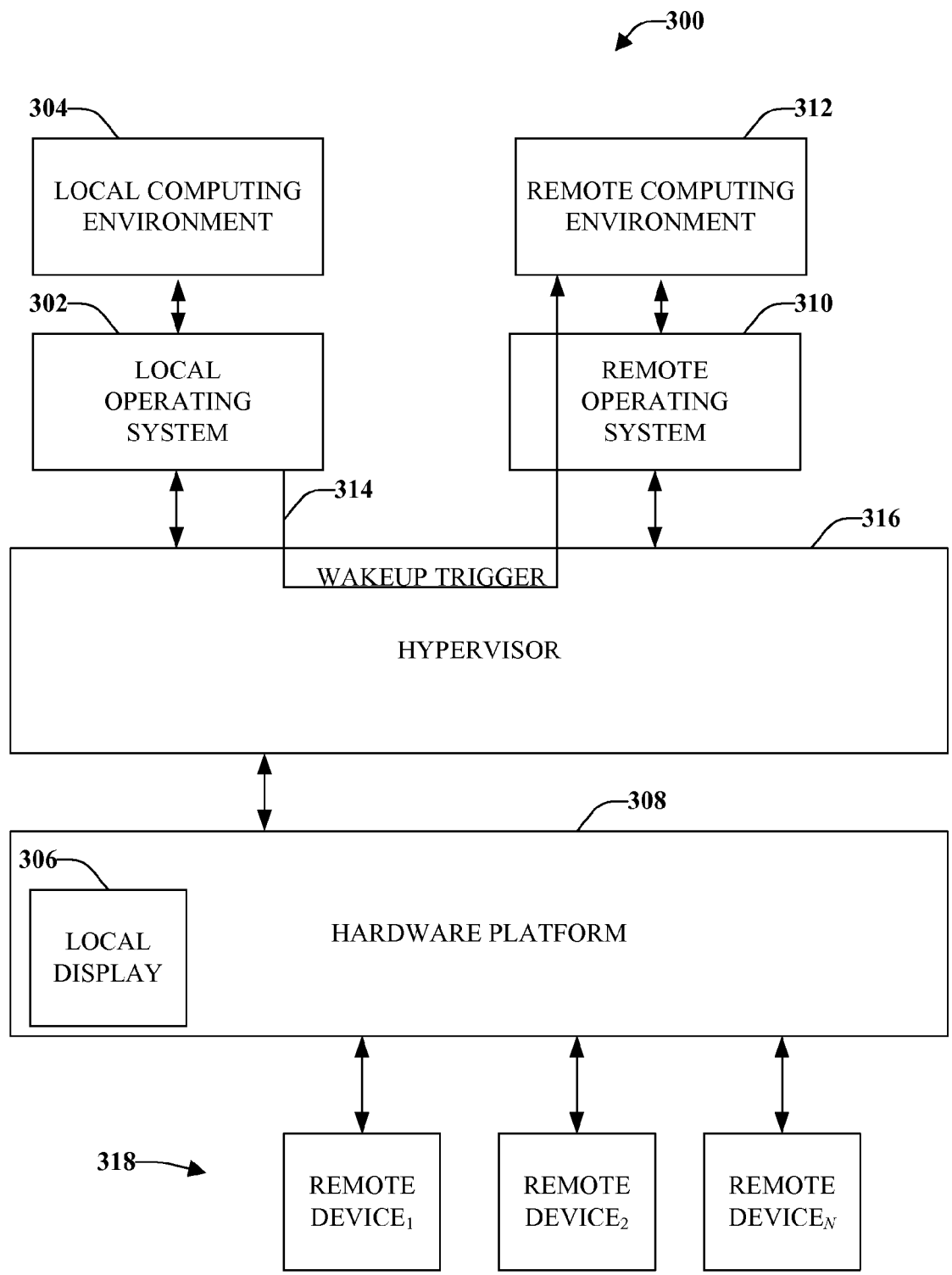
FIG. 3 illustrates another architecture in accordance with some aspects.

FIG. 3 illustrates another architecture 300 in accordance with some aspects. Architecture 300 can reside at least partially within a user device. Typically, a mobile device has its own local operating system 302, which can run a small set of applications within a local computing environment 304. The local operating system 302 can be configured for voice calls, data calls, and so forth. The mobile device can also have a local display 306 associated with a hardware platform 308. Included in the hardware platform 308 can be multiple drivers for multiple displays, for example.

Also included in the example architecture 300 is at least one remote operating system 310 that can activate a remote computing environment 312, which are not included on a user device. The remote operating system 310 can be dormant until a wakeup trigger 314 is received from the local operating system 302. The wakeup trigger 314 can be activated based on detection of a suitable remote computing environment 312 and/or based on other factors (e.g., user selection, configurable rules, configurable policies, and so forth).

A hypervisor 316 can be enabled to operate the multiple operating systems (e.g., local operating system 302 and remote operating system(s) 310). A hypervisor is a lower level operating system that communicates with the platform 308 and the virtual hardware, labeled as $device_1$, $device_2$, through $device_N$, where N is an integer, and referred to collectively as virtual hardware or remote devices 318, which are not included on user device. Normally, the local operating system 302 runs directly on the hardware, however, since the hardware is virtual hardware 318, the hypervisor 316 pretends to be the hardware that the local operating system 302 supports. In such a manner, the local operating system 302 does not need to know that the hardware is virtual hardware 318. Thus, the hypervisor 316 operates as an interface between the local operating system 302 and the virtual hardware 318. Further, the hypervisor 316 can control access to the virtual hardware 318.

Figure 4:
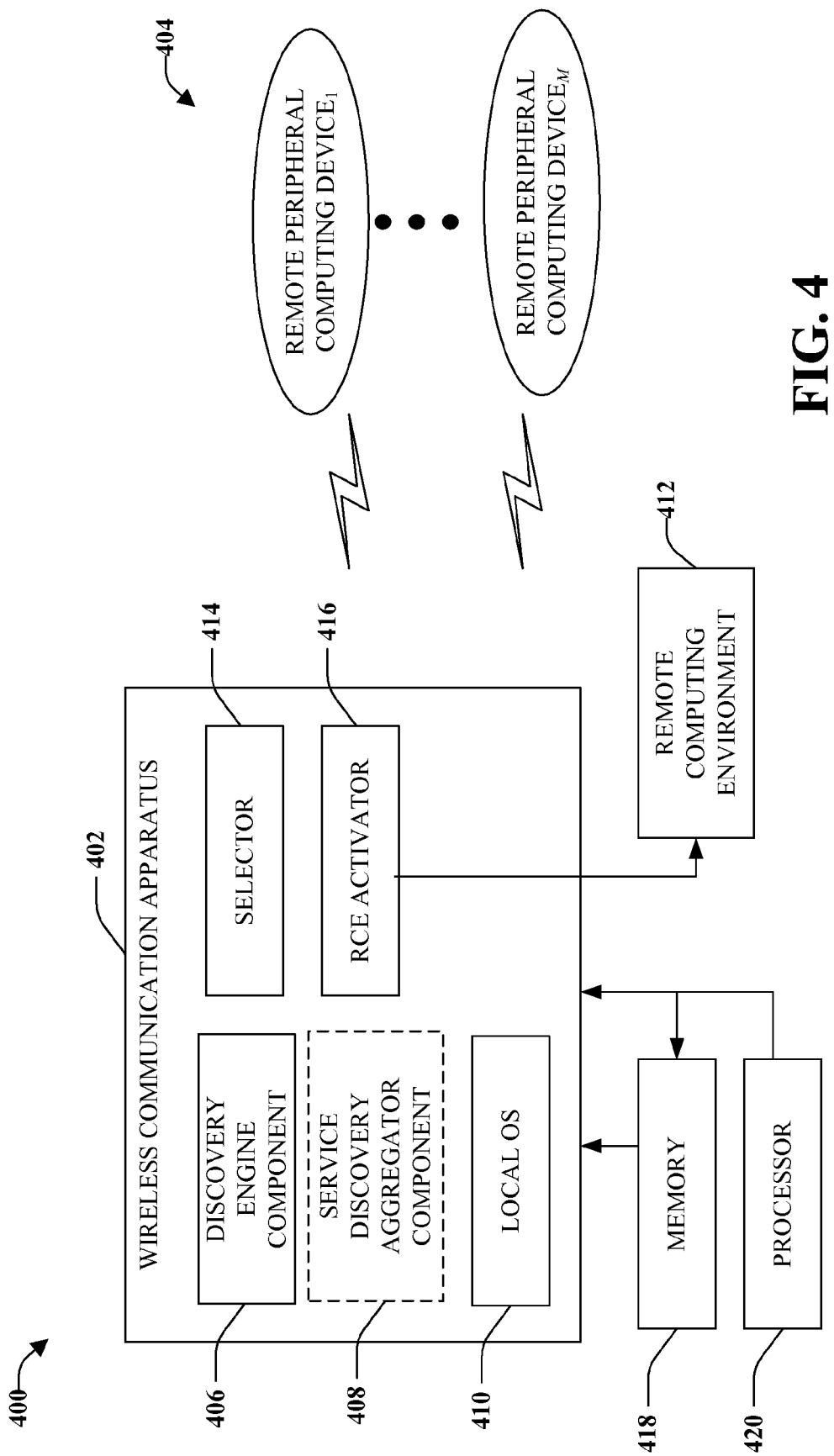
FIG. 4 illustrates a system for detecting remote devices for computing in a remote computing environment in accordance with an aspect.

FIG. 4 illustrates a system 400 for detecting remote devices for computing in a remote computing environment in accordance with an aspect. The detection can be of wireless devices (e.g., using UWB RF interfaces) needed for computing (e.g., a wireless mouse, a wireless keyboard, a wireless display, a wireless scanner, a wireless printer, and so forth). In accordance with some aspects, the detection can be of devices (e.g., mouse, keyboard, display, scanner, printer) to which a wired connection is available. Detection of wireless and/or wired devices can trigger a signal that subsequently activates a computing desktop environment, for example. Different virtual machines (e.g., one for a phone environment and one for a computing environment) can be supported such that a dormant computing virtual machine is activated (e.g., woken up) when a wake-up trigger (which can be location based) is activated.

System 400 includes a wireless communications apparatus 402 that is configured to transmit and/or receive data from one or more remote computing peripheral machines. These machines are labeled remote peripheral computing $device_1$ through remote peripheral computing $device_M$, where M is an integer, and are referred to collectively as remote peripheral computing devices 404. It should be understood that although the communication link between the wireless communications apparatus 402 and the remote peripheral computing devices 404 is shown to be wireless, the disclosed aspects are not so limited and the communication link can be wired, wireless, or combinations thereof. For example, apparatus 402 can be in an environment where a display is connected through a wired link and a printer is connected through a wireless link (or vice versa).

In accordance with some aspects, apparatus 402 and devices 404 can communicate through a hub. Further, apparatus 402 and devices 404 can communicate over a certain wireless protocol (e.g., ultra-wide band to the hub, or another protocol to the hub), provided the hub is configured to handle multiple protocols. Wireless protocols (e.g., CDMA, LTE, and so on) can provide network connectivity or call connectivity or internet data connectivity. Local and/or remote computing environments can have network connectivity using these protocols.

Apparatus 402 can include multiple operating systems and/or an optional hypervisor (as discussed with reference to FIG. 3 above). Apparatus 402 might be moved to an area where there are one or more remote devices 404 (e.g., keyboard, mouse, display, printer, scanner, and so forth). A discovery process can be initiated by a discovery engine component 406 to detect the one or more remote devices 404. In accordance with some aspects, discovery engine component 406 can be configured to automatically perform a discovery process (e.g., periodically, at predefined intervals, at random intervals, at configurable intervals, and so forth). The discovery process can be performed regardless of the mode of operation (or energy level) of apparatus (e.g., standby mode, low energy mode, high energy mode, and so forth). According to some aspects, the discovery process can be initiated based upon a manual request. For example, automatic discovery might be disabled by the user (e.g. to conserve system resources) and, when the user desires to utilize one or more remote devices, the user selectively initiates the discovery process. The user can initiate discovery through a user interface, manually inputting the request, verbally requesting the discovery process, and so on. In accordance with some aspects, both automatic discovery and manual discovery can be utilized at substantially the same time. In accordance with some aspects, the discovery process can be performed automatically and a prompt presented to the user. The prompt can provide the user the option to select one or more of the discovered devices.

The discovery protocol can be any protocol that can be utilized to discover other devices (e.g., available remote computing peripheral devices 404). Thus, in an optional aspect, as denoted by the dashed line, communications apparatus can include a service discovery aggregator component 408 that is configured to aggregate information related to different wireless protocols or multiple wired connections. For example, two or more remote computing devices 404 might utilize different wireless protocols to communicate wirelessly. Each device might only be able to communicate utilizing its respective protocol. However, communications apparatus 404 can be configured to communicate to the devices over different protocols.

In accordance with some aspects, there can be multiple wireless protocols and/or discovery protocols on top of the multiple wireless protocols. According to some aspects, a combined discovery engine can aggregate information from multiple discovery engines (e.g., a discovery engine for each of the specific wireless protocols) and aggregate the wireless protocols. In an example, the discovery protocol can be Bluetooth, ultra-wide band, Wi-Fi, another wireless protocol, or combinations thereof. More than one protocol can be utilized, provided apparatus 402 supports multiple protocols (e.g., short-range wireless protocols). For example, a display can operate over ultra-wide band and a mouse and a keyboard can operate over Bluetooth®. Wireless communications apparatus 402 can be configured to support multiple protocols while each remote peripheral computing device 404 might be enabled to only support one protocol (e.g., its respective protocol).

In accordance with some aspects, discovery engine component 406 can operate on top of a local operating system 410. The wireless links or radios can be managed by the local operating system 410, wherein a remote computing environment 412 is dormant. The discovery engine component 406 can obtain information about the vicinity (e.g., the available devices) through the local operating system 410.

The discovery of the remote devices 404 can indicate the type of device, the service provided by the device, whether the device is available (e.g., not in use by another device and/or a user), and so forth. In accordance with some aspects, the discovery can be performed in a backhaul and devices can be monitored less often, such as only when a new location area is entered (e.g., when the mobile device is moved), which can save energy, system resources, and mitigate battery power requirements. The aspects that utilize manual discovery (e.g., the user selectively initiates discovery only when the user desires to utilize a remote computing environment 412) can provide increased energy savings.

It should be noted that the remote peripheral devices 404 should be enabled to operate in a remote computing environment. That is to say, the remote device should be available and allowed to operate as a remote computing device. If a remote peripheral device 404 is not enabled to operate in the remote computing environment, the device might include in its broadcast information that it is not available and/or might not broadcast information related to a remote computing environment.

Also included in wireless communications apparatus 402 is a selector 414 that is configured to select one or more of the discovered remote devices 404. This selection can be an automatic selection, a manual selection, or combinations thereof. For example, a user might desire to utilize a remote scanner in order to scan a business card and maintain that business card on the mobile device. The user might search through the listing of discovered devices and manually choose a device that provides scanning capabilities.

Automatic selection can be made based on rules and/or policies that relate to the type of device, the number of devices, the type and number of devices, as well as other parameters (e.g., type of connection, signal strength, and so forth). For example, a rule can be established that specifies a minimum combination of devices that should be available before activating a remote computing environment 412. For example, a minimum threshold rule might be that at least one display, at least one keyboard, and at least one mouse device should be available prior to the remote computing environment 412 being activated. If one or more of the devices are not available, the remote computing environment 412 is not automatically activated. For example, if there is a mouse and a display available, but not a keyboard, the remote computing environment 412 is not activated, according to a configurable rule or policy.

In accordance with some aspects, the automatic selection can be made based upon a rule or policy that specifies preferences. A preference can be that a remote device with wired connection capability (e.g., mobile device and remote device communicate over a wired link) might be preferred over a wireless link. However, according to various aspects, a wireless link might be preferred over a wired link. In another example, a preference can be that a signal strength between apparatus 402 and a remote device 404 be above a configurable threshold (e.g., if signal strength is at or above a certain value, the link is enabled; or, if signal strength is at or below a certain value, the link is not enabled (or is disabled)). In another example, a stronger wireless link can be preferred over a weaker wireless link, and so forth. Other rules and/or parameters can also be configured by a user, through applications running on the apparatus, or through other techniques (e.g., by a device manufacturer, a device supplier, a service provider, and so forth).

In accordance with some aspects, the communication between apparatus 402 and one or more remote devices 404 is through a dock or a docking station. The dock can be in a wired connection between the apparatus 402 and a wired and/or wireless connection with one or more of the remote devices 404. According to some aspects, a hub provides a wireless interface between the apparatus 402 and one or more remote devices 402. Further, according to some aspects, a hub, a dock, direct connections (e.g., wired or wireless links interfacing apparatus 402 directly to remote peripheral devices 404), or combinations thereof can be utilized.

After selection of one or more remote devices 404, a remote computing environment (RCE) activator 416 can wake up the remote computing environment 412 (which may have been dormant). The RCE activator 416 can convey a trigger (sometimes referred to as a wakeup trigger) to activate and establish a communication link with the one or more selected remote devices 404.

In accordance with some aspects, remote computing environment 412 includes a full featured operating system with traditional support (e.g., more power than apparatus 402). Similar operations can be performed by local operating system 410 and the remote computing environment 412; however, local operating system 410 can have a scaled down version (due to limited capabilities, power, and resources available by apparatus 402). In accordance with some aspects, two different browsers can be operating at substantially the same time, a first browser on local operating system 410 and a second browser on the remote computing environment 412.

System 400 can include memory 418 operatively coupled to communications apparatus 402. Memory 418 can be external to communications apparatus 402 or can reside within communications apparatus 402. Memory 418 can store information related to performing local processing, which can be functions typically associated with a local processing environment. Memory 418 also retains instructions related to gathering a list of available remote peripheral devices, selecting one or more available remote peripheral devices, and enabling a remote computing environment that comprises the selected remote peripheral devices. The remote computing environment and the local processing can provide different user experiences at substantially the same time (or at different times). Memory 418 can also store other suitable information related to signals transmitted and received in a communication network. A processor 420 can be operatively connected to communications apparatus 402 (and/or memory 418) to facilitate analysis of information related to remote computing devices in a communication network. Processor 420 can be a processor dedicated to analyzing and/or generating information received by communications apparatus 402, a processor that controls one or more components of system 400, and/or a processor that both analyzes and generates information received and/or sent by communications apparatus 402 and controls one or more components of system 400.

Memory 418 can store protocols associated with remote computing environments as discussed herein, taking action to control communication between communications apparatus 402 and remote devices 404, and so forth, such that system 400 can employ stored protocols and/or algorithms to enable a remote computing environment as described herein. It should be appreciated that the data store (e.g., memories) components described herein can be either volatile memory or nonvolatile memory, or can include both volatile and nonvolatile memory. By way of example and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of example and not limitation, RAM is available in many forms such as synchronous RAM (DRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Memory of the disclosed aspects are intended to comprise, without being limited to, these and other suitable types of memory.

Figure 5:
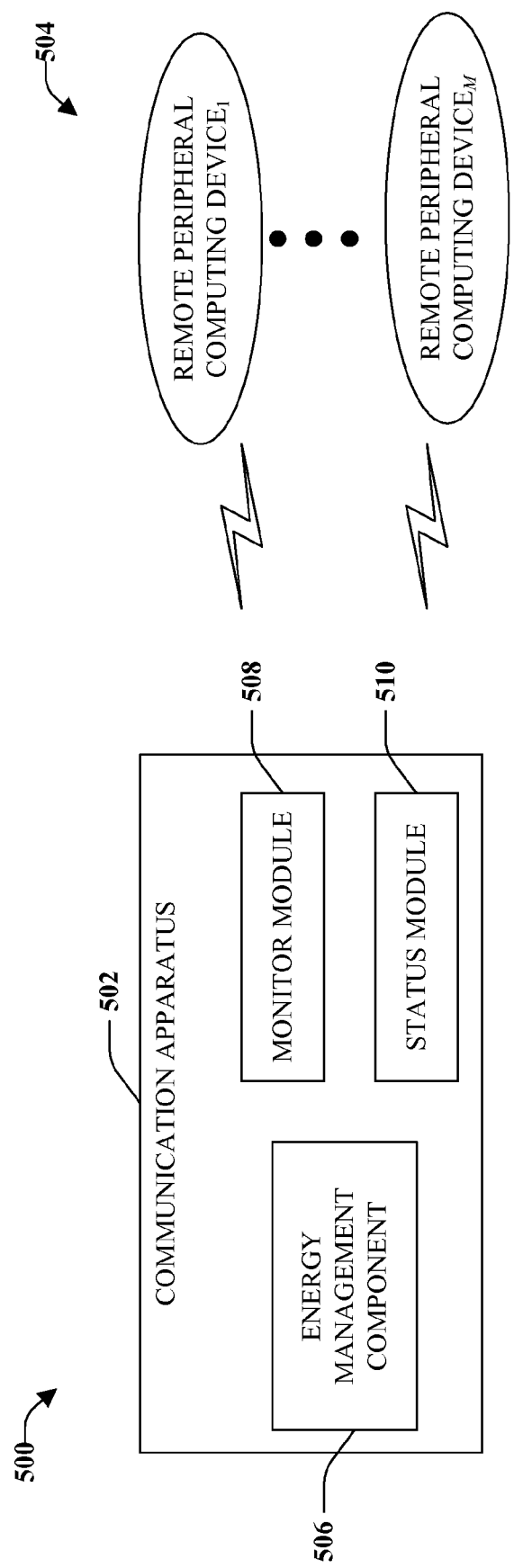
FIG. 5 illustrates a system for enabling a wakeup trigger to support multiple user interfaces, environments, and/or virtual machines according to various aspects disclosed herein.

FIG. 5 illustrates a system 500 for enabling a wakeup trigger to support multiple user interfaces, environments, and/or virtual machines according to aspects disclosed herein. System 500 can be configured to detect and selectively establish a remote operating environment. Further, system 500 can be configured to selectively deactivate the remote operating environment based on various criteria in order to conserve system resources.

System 500 includes a communications apparatus 502 that can communicate with one or more peripheral devices. As communication apparatus 502 is operated and moved, communications apparatus 502 can come within range of one or more remote computing devices, illustrated at 504, that can provide a remote computing environment for the user of communications apparatus 502. One or more of the remote computing devices 504 can be selectively activated (e.g., manually, automatically, and so on). In accordance with some aspects, more than one communication apparatus might be utilizing remote computing device(s) at substantially the same time (e.g., printer).

Wireless communication apparatus 502 includes an energy management component 506 that is configured to monitor the computing environment and selectively enable/disable one or more remote computing devices 504. For example, as wireless apparatus 502 is moved away from a remote computing environment, the higher computing and processing environment associated with the one or more remote computing devices 504 is transferred to a dormant state.

Energy management component 506 can monitor (e.g., periodically, continuously), the availability of one or more remote peripheral devices 504. If one or more remote peripheral devices 504 are no longer available (e.g., as a user walks away from the remote computing environment, when connectivity is no longer available, and so forth), the remote computing environment can be automatically stopped or deactivated. In accordance with some aspects, the energy management component 506 is associated with discovery engine component 406, illustrated and discussed with reference to FIG. 4, wherein discovery engine component 406 can operate in different modes. For example, a first mode can be a discovery mode and a second mode can be a monitoring mode. After discovery (and activation of remote computing environment) during discovery mode, communications apparatus 402, 502 enters the monitoring mode to determine whether or not one or more remote peripheral devices 504 are still available.

In accordance with some aspects, a wireless link might be temporarily lost, however, communication apparatus 502 might not have moved from the remote computing environment. In accordance with this aspect, a monitoring module 508 can be configured to continuously (or periodically) query (or ping) the remote peripheral computing device(s) 504 to which communications apparatus 502 is connected. If for some reason one or more remote peripheral computing devices 504 are unavailable (e.g., temporary loss of signal), monitoring module 508 will reattempt to contact the device up to a configurable number of tries, until expiration of a timer, or the like. Thus, if there is a temporary loss of signal, on a retry attempt, the signal might be reestablished and a link with remote peripheral computing device 504 will not be deactivated for these temporary signal losses.

According to some aspects, energy management component 506 can be configured to enable different modes of energy. For example, a low energy mode can be enabled whereby communication apparatus 502 is conducting discovery but is not performing any processing or computing tasks. Thus, communication apparatus 502 can be in a low energy discovery mode plus a standby mode (e.g., waiting for user input, waiting for an incoming communication, and so on). A medium energy mode can be enabled wherein communication apparatus 502 is performing limited local processing while also conducting discovery for remote devices. Energy management component 506 can also enable a high energy mode where both a local and a remote computing environment are being driven by communication apparatus 502. In accordance with some aspects, there can be an intermediate energy mode (which is between a medium energy mode and a high energy mode). In this intermediate energy mode, communication apparatus 502 can be driving a remote computing environment while a local computing environment is in standby mode (e.g., waiting for an incoming communication, waiting for user input, and so forth). In standby mode, the local computing environment might be monitoring remote devices to determine whether those devices are still available and/or if there are any new remote devices discovered.

Additionally or alternatively, a status module 510 can be associated with communications apparatus 502. Status module 510 can be configured to present to the user status of a connection with one or more peripheral computing devices 504. The status can include an identification of peripheral device, capabilities of peripheral device, connection status of communication link, and other information (e.g., signal strength). The status can also provide a listing of peripheral computing devices that are available but are not currently connected with communication apparatus 502.

Status module 510 can be configured to present an indication of the status on a peripheral display and/or on a display associated with communications apparatus 502. For example, if a connection with a remote mouse is lost, the status indicator on the remote display and/or the local display can indicate the lost connection. If a connection with a remote display is lost, the status of that connection can be automatically presented on the local display.

In accordance with some aspects, a communication might be lost during a communication transfer. For example, a user might desire to send an email and, while the email is being sent, the user walks away from the computing environment. In accordance with this aspect, the email packet can be on the platform (e.g., platform 206 of FIG. 2). Communications apparatus 502 can include a separate connection (e.g., WAN connection) and complete the transaction at a later time if needed. Thus, a local operating system can monitor the status of data transfer and finish the data transfer as needed, which can be managed by a hypervisor and/or platform, according to an aspect.

Additionally, communications apparatus 502 can be associated with a memory that retains instructions related to enabling a remote communications environment as disclosed herein. A processor can be operatively connected to memory and/or communications apparatus 502 and can be configured to execute the instructions retained in memory.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement the methodologies described herein. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
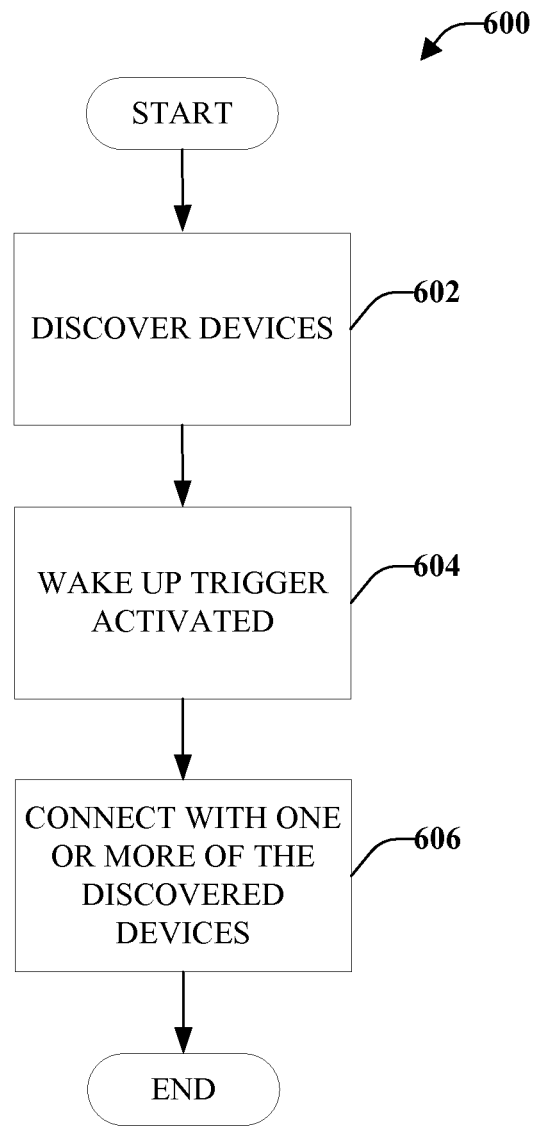
FIG. 6 illustrates a method for discovering one or more devices with which to connect to enable a remote computing experience according to one or more of the disclosed aspects.

FIG. 6 illustrates a method 600 for discovering one or more devices with which to connect to enable a remote computing experience according to one or more of the disclosed aspects. A user device capable of wireless Internet access can be in the vicinity of computing peripheral devices such as a mouse, a keyboard, speakers, a monitor, and/or other peripheral devices. User device can become aware of the presence of these computing peripheral devices, connect to one or more of the devices, and provide a remote computing environment for the user through utilization of the computing peripheral devices. The remote computing environment can be utilized at substantially the same time as a local computing environment and/or at a different time.

At 602, one or more computing peripheral devices are discovered. The discovery process can be performed automatically, such as at predetermined intervals, or based on other criteria, such as at a customizable interval (e.g., every 5 seconds, every minute, and so forth), based on detection of a new area (e.g., when entering a room), and so on. In accordance with some aspects, the discovery process can be performed based on a manual input received from a user. For example, the user might desire to view a video on a remote computing display, which can be a larger display than the display associated with the user's mobile device (which can be utilized for other functions, such as text messaging, for example). In this situation, the user can manually request discovery of an appropriate display in a remote computing environment. In accordance with this aspect, the manually triggered discovery process can be utilized in place of, or in combination with, an automatically generated discovery process. For example, a user can disable an automatic computing peripheral device discovery process and manually trigger the discovery process when the user desires to utilize one or more peripheral devices.

After the discovery process is performed, a wake-up trigger is activated, at 604. The wakeup trigger activates a remote computing environment, which can include one or more of the discovered computing peripheral devices. In accordance with some aspects, the wakeup trigger can provide an interrupt into an interrupt controller. The interrupt can be a dedicated interrupt or could be bitwise "OR"ed with other interrupts. The interrupt can cause an interrupt service routing to be processed. This interrupt routine can interact with an energy management engine on the platform in order to change the state of a platform to a higher energy state. The energy management engine can further activate a desktop applications processing environment.

At 606, a connection with one or more of the discovered devices is established. This connection can be a wired connection, a wireless connection, or combinations thereof. For example, the connection can be through a hub that acts as an interface between a mobile device and one or more computing peripheral devices. In another example, a mobile device can connect to a first device in the remote computing environment wirelessly and to a second device in the remote computing environment through a wired connection, or combinations thereof. The remote computing environment provides a different user experience relative to a local computing environment operating on user device. The local computing environment can include processes typically performed by user device (e.g., voice calls, data calls, and so forth).

Figure 7:
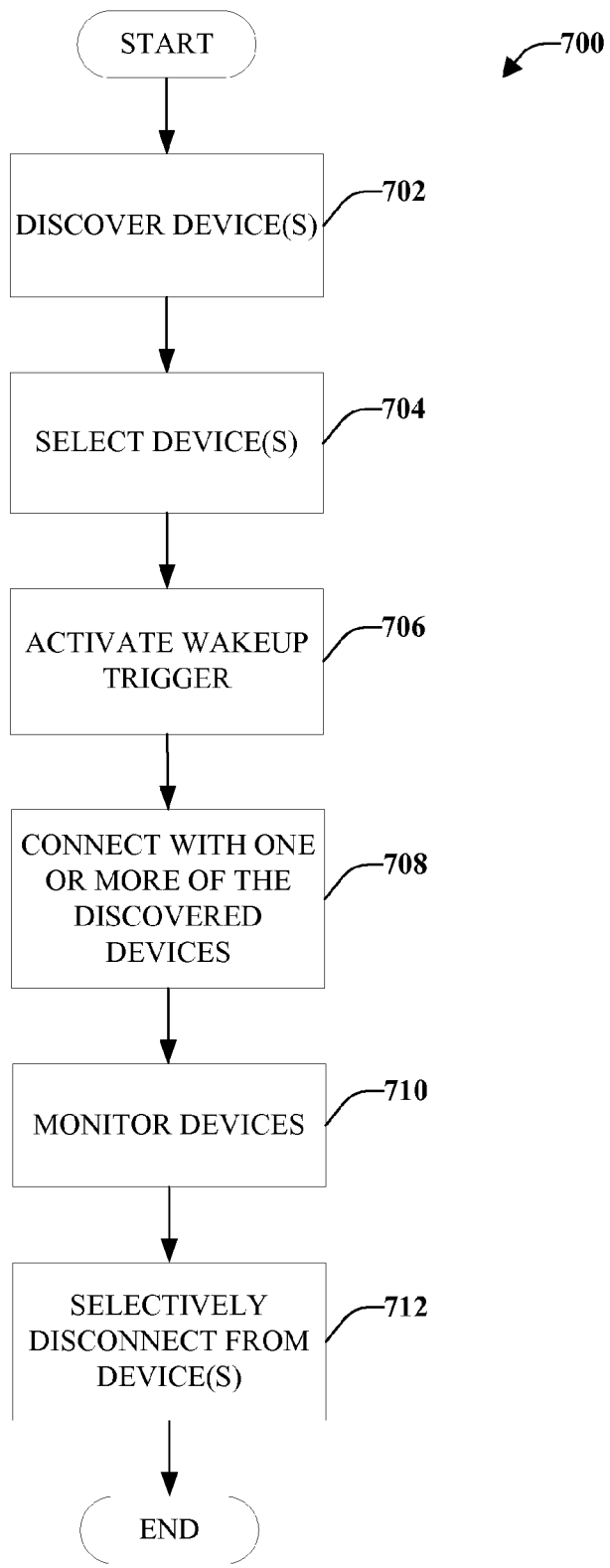
FIG. 7 illustrates a method for discovering and selectively connecting to peripheral devices in a remote computing environment according to some aspects.

FIG. 7 illustrates a method 700 for discovering and selectively connecting to peripheral devices in a remote computing environment according to some aspects. Method 700 can be utilized to detect and establish a remote computing environment, which can be utilized at substantially the same time as a local computing environment is utilized. Method 700 can also monitor the remote computing environment and selectively determine whether the remote computing environment should be disabled. For example, a mobile device (e.g., smart phone device) capable of wireless internet access is placed in the vicinity of computing peripheral devices such as a mouse, keyboard, and a monitor. The mobile device becomes aware of the presence of these computing peripheral devices, connects to them wirelessly, and presents a computing environment on the monitor with wireless internet access, for example. If the mobile device (or monitor) is moved out of range and the devices can no longer communicate, the connection can be selectively disabled.

One or more peripheral devices are discovered, at 702. The discovery can occur when a user device is in close proximity to wireless computing peripheral devices (e.g., a wireless mouse, a wireless keyboard, a wireless display/monitor, wireless speakers, and so forth), which can be referred to as a location based discovery activation. For example, a user device can be moved to various locations (e.g., a user walks around with the user device) and as that user device is moved, the user device can perform a discovery process to detect peripheral devices within the area. The discovery process can be performed automatically, manually, or combinations thereof.

Wireless computing peripheral devices that can communicate with user device (performing the discovery process) can register with user device. Communication between peripheral devices and user device can be over any protocol (e.g., Wireless USB over UWB wireless interfaces). Thus, discovery can be obtained over multiple protocols as a function of the protocols supported by each peripheral device. Thus, if a first peripheral device supports one protocol and a second (or more) peripheral device supports a second protocol, the discovery/communication can be over both protocols (or over as many protocols as can be supported by user device).

In accordance with some aspects, a listing or other means of identifying each of the peripheral devices can be presented to the user. The listing can include a unique device identifier, capabilities of the device and/or associated information (e.g., type of connection, signal strength, and so forth). For example, a list of available devices can be rendered on a display and the user can select one or more devices that the user desires to operate remotely. In accordance with some aspects, the selection of one or more remote computing devices can be performed automatically based on rules or policies associated with a remote computing environment. For example, a rule can be established that there must be a minimum number of available components and/or a certain type or types of available components (e.g., minimum device threshold). The minimum threshold can relate to a minimum combination or set of components. In an example, the minimum threshold might be at least one remote keyboard, at least one remote mouse, and at least one remote display. In another example, rules can be established to choose between two remote components that perform similar functions. Thus, if two (or more) remote keyboards are discovered, the selection can be based on whether the connection is a wired or wireless connection, a signal strength of a wireless connection, the proximity of the remote keyboard to the user device, and/or based on other criteria.

At 706, a wakeup trigger is activated and connections with one or more of the selected devices are established, at 708. Monitoring of the devices is performed, at 710. The monitoring can be performed periodically, continually, based on a configurable interval, and so forth. This monitoring can determine whether a connection between the user device and the peripheral device is still available (e.g., connectivity has not been lost), whether the peripheral device is still available (e.g., not used by another user), or other criteria.

In accordance with some aspects, energy management is provided wherein as a user of the mobile device walks away from the remote computing environment, the higher computing and processing environment becomes dormant and/or the connections are disabled. In another example, as the user walks away from the remote computing environment, the mobile device detects that the computing environment is no longer available and automatically stops utilizing and/or attempting to utilize the remote devices, at 712.

Figure 8:
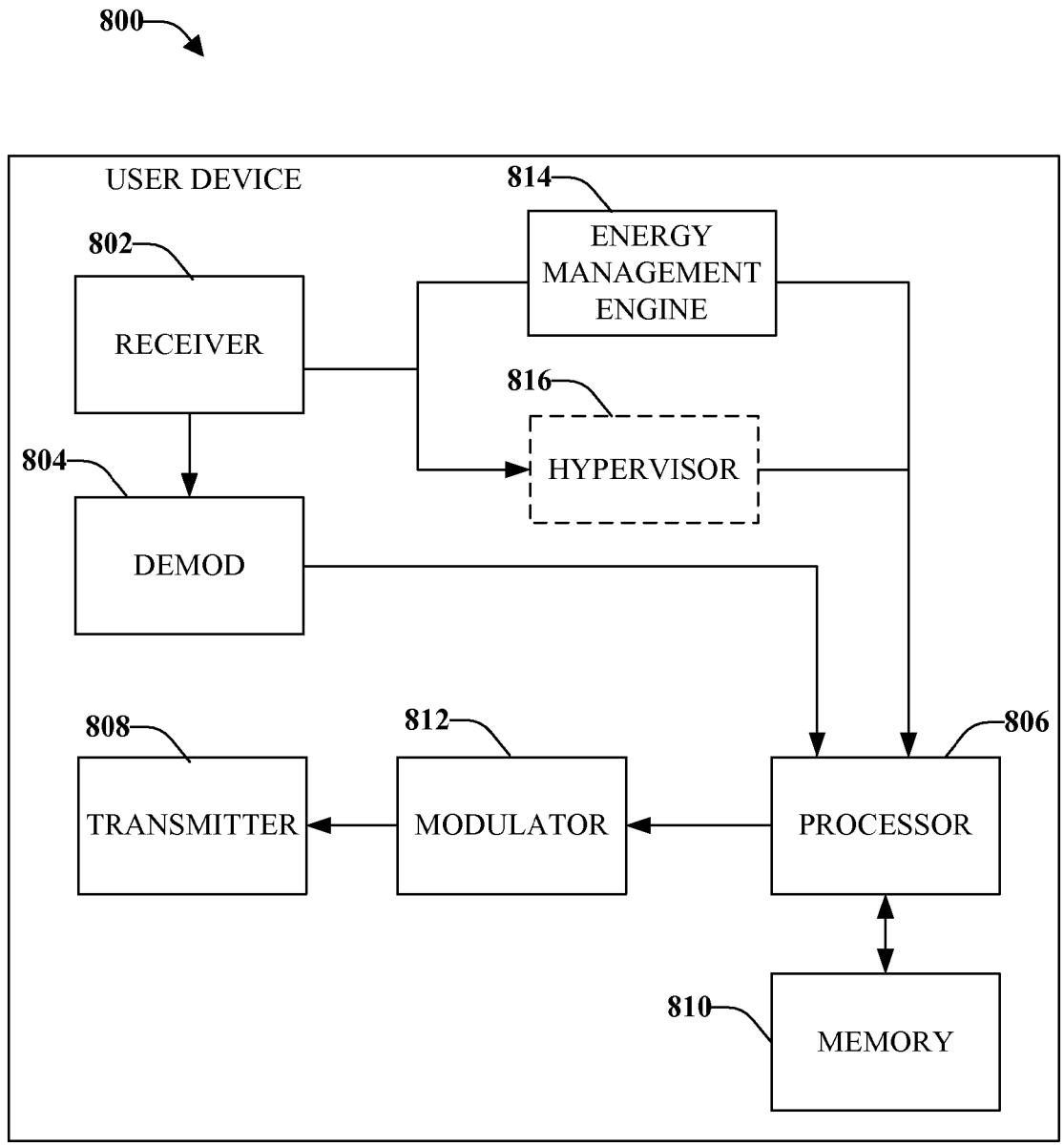
FIG. 8 illustrates a system that facilitates enacting a wakeup trigger to support multiple user interfaces, environments, and/or virtual machines in accordance with one or more of the disclosed aspects.

With reference now to FIG. 8, illustrated is a system 800 that facilitates enacting a wakeup trigger to support multiple user interfaces, environments, and/or virtual machines in accordance with one or more of the disclosed aspects. System 800 can reside in a user device. System 800 comprises a receiver 802 that can receive a signal from, for example, a receiver antenna. The receiver 802 can perform typical actions thereon, such as filtering, amplifying, downconverting, and so forth the received signal. The receiver 802 can also digitize the conditioned signal to obtain samples. A demodulator 804 can obtain received symbols for each symbol period, as well as provide received symbols to a processor 806.

Processor 806 can be a processor dedicated to analyzing information received by receiver component 802 and/or generating information for transmission by a transmitter 808. In addition or alternatively, processor 806 can control one or more components of user device 800, analyze information received by receiver 802, generate information for transmission by transmitter 808, and/or control one or more components of user device 800. Processor 806 may include a controller component capable of coordinating communications with additional user devices.

User device 800 can additionally comprise memory 808 operatively coupled to processor 806 and that can store information related to coordinating communications and any other suitable information. Memory 810 can additionally store protocols associated with a remote computing environment. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 808 of the subject systems and/or methods is intended to comprise, without being limited to, these and any other suitable types of memory. User device 800 can further comprise a symbol modulator 812 and a transmitter 808 that transmits the modulated signal.

Receiver 802 is further operatively coupled to an energy management engine 814 that is configured to change a state of a platform (e.g., hardware platform) to a higher energy state and activate a desktop applications processing environment in accordance with the one or more aspects disclosed herein. Additionally, receiver 802 can be operatively coupled to a hypervisor 816 that is configured to identify computing peripheral devices, activate a wakeup trigger signal, and so forth. The hypervisor 816 is optional, as denoted by the dashed box. Hypervisor 816 can enable a remote computing environment in a virtualized manner, according to an aspect.

Figure 9:
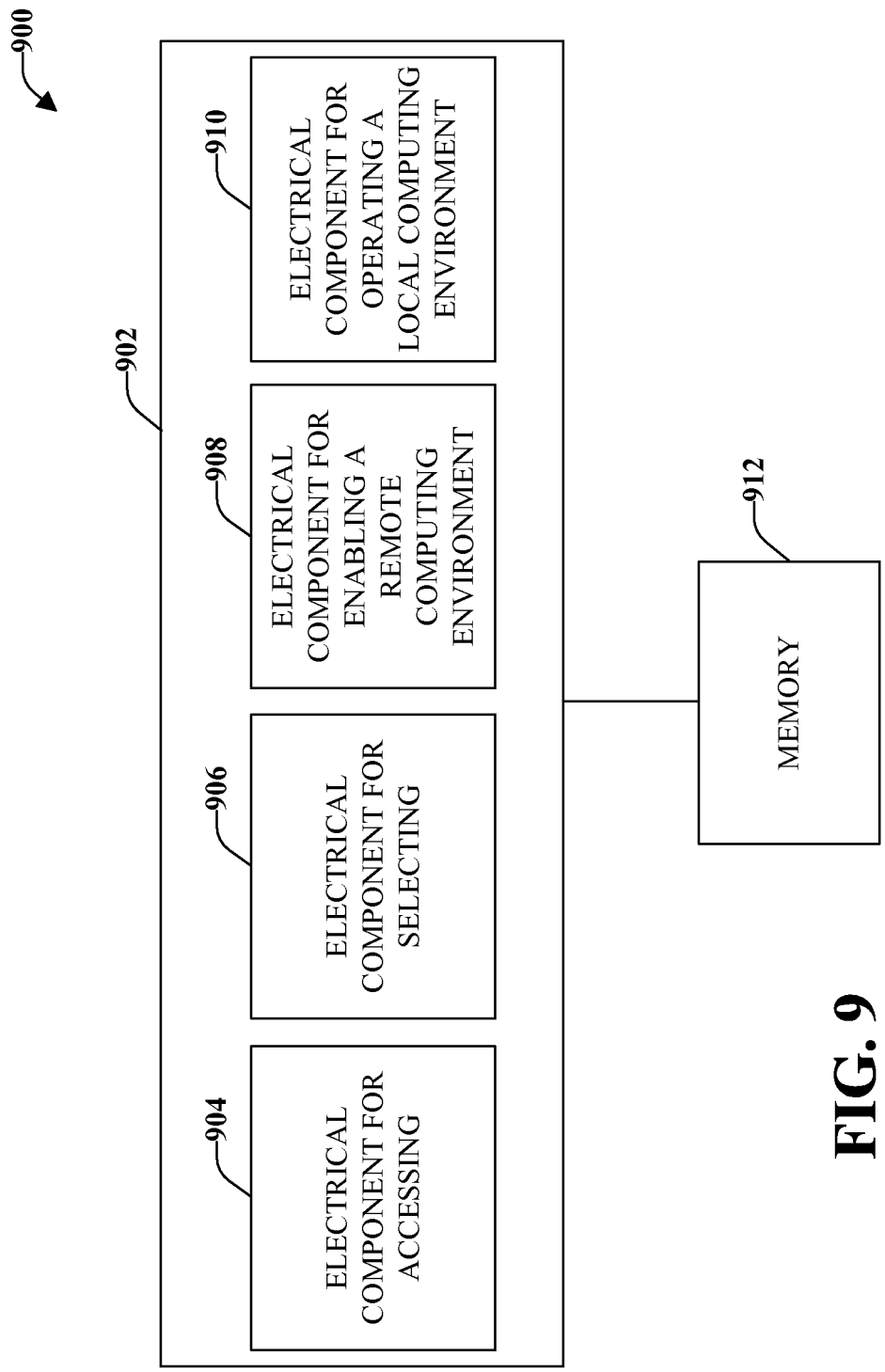
FIG. 9 illustrates an example system that enables a remote computing environment in accordance with the various aspects presented herein.

With reference to FIG. 9, illustrated is an example system 900 that enables a remote computing environment in accordance with the various aspects presented herein. System 900 can reside at least partially within a mobile device. It is to be appreciated that system 900 is represented as including functional blocks, which may be functional blocks that represent functions implemented by a processor, software, or combination thereof (e.g., firmware).

System 900 includes a logical grouping 902 of electrical components that can act separately or in conjunction. Logical grouping 902 can include an electrical component 904 for accessing a list of available remote peripheral devices. The listing of remote peripheral devices can include an identification of the device, device capabilities, and other information. In accordance with some aspects, the list of available remote peripheral devices can be accessed based on a discovery process, which can be generated automatically, manually, or combinations thereof.

Also included in logical grouping 902 is an electrical component 906 for selecting at least one of the available remote peripheral devices. According to some aspects, the remote peripheral device(s) can be chosen as a function of availability of at least a threshold number of devices and/or type of devices. For example, a user can configure a set of rules that indicate minimum number and type of devices (e.g., one keyboard, one mouse, and one display) that should be available before selection of the devices.

In accordance with some aspects, electrical component 906 can be configured to determine that two or more of the available remote peripheral devices offer a similar function. Based in part on this determination, electrical component 906 can select one of the two or more peripheral devices based on conformance with a set of rules. The rules are configurable and can include instructions to select a wired link over a wireless link, to select a stronger wireless link over a weaker wireless link, or combinations thereof.

Logical grouping 902 also includes an electrical component 908 for enabling a remote computing environment that includes the chosen device(s). To enable the remote computing environment electrical component 908 can be configured to convey a wake up trigger, based on the device selection. Electrical component 908 can also be configured to implement a higher energy state. In accordance with some aspects, the remote computing environment is automatically enabled based on a close proximity connection to at least one remote peripheral device. According to some aspects, the remote computing environment is automatically activated as a function of interaction with a docking station that has connectivity to one or more of the available remote peripheral devices. Further, the remote computing environment can be automatically activated as a function of a close proximity connection to a wireless hub.

Further, logical grouping 902 includes an electrical component for operating a local computing environment that provides a user experience that is different from an experience provided by the remote computing environment. Thus, the user can perform a first set of functions with the local computing environment and a second set of functions with the remote computing environment.

Additionally or alternatively, logical grouping 902 can include an electrical component for monitoring availability of the at least one chosen remote peripheral device. Also included can be an electrical component for selectively deactivating the remote computing environment if the at least one chosen remote peripheral device is no longer available.

Additionally, system 900 can include a memory 910 that retains instructions for executing functions associated with electrical components 904, 906, and 908 or other components. While shown as being external to memory 910, it is to be understood that one or more of electrical components 904, 906, and 908 can exist within memory 910.

It is to be understood that the aspects described herein may be implemented by hardware, software, firmware or any combination thereof. When implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art. Further, at least one processor may include one or more modules operable to perform the functions described herein.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), CDMA2000, etc. UTRA includes Wideband-CDMA (W-CDMA) and other variants of CDMA. Further, CDMA2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product may include a computer readable medium having one or more instructions or codes operable to cause a computer to perform the functions described herein.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine-readable medium and/or computer readable medium, which may be incorporated into a computer program product.

While the foregoing disclosure discusses illustrative aspects and/or aspects, it should be noted that various changes and modifications could be made herein without departing from the scope of the described aspects and/or aspects as defined by the appended claims. Accordingly, the described aspects are intended to embrace all such alterations, modifications and variations that fall within scope of the appended claims. Furthermore, although elements of the described aspects and/or aspects may be described or claimed in the singular, the plural is contemplated unless limitation to the singular is explicitly stated. Additionally, all or a portion of any aspect and/or aspect may be utilized with all or a portion of any other aspect and/or aspect, unless stated otherwise.

To the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is intended to mean an inclusive "or" rather than an exclusive "or". That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

What is claimed is:

1. A method for enabling a remote computing environment, comprising:
    employing a processor to perform the following acts:
        obtaining a list of available remote peripheral devices;
        choosing at least two of the available remote peripheral devices based on a minimum required combination of the available remote peripheral devices, wherein choosing the at least two of the available remote peripheral devices comprises:
            ascertaining that two or more of the available remote peripheral devices offer a similar function; and
            selecting one of the two or more available peripheral devices that offer the similar function based on conformance with a set of rules, wherein the set of rules comprises selecting a wired link over a wireless link, selecting a stronger wireless link over a weaker wireless link, or combinations thereof; and
        activating the remote computing environment, wherein the remote computing environment comprises the at least two chosen available remote peripheral devices and provides a different user experience compared with a local computing environment of a mobile device.

2. The method of claim 1, wherein the activating the remote computing environment comprises:
    conveying a wake up trigger; and
    changing a current energy state to an energy state which enables the remote computing environment.

3. The method of claim 1, wherein the list of available remote peripheral devices is obtained over multiple protocols as a function of protocols supported by each of the available remote peripheral devices.

4. The method of claim 1, wherein the local computing environment is in standby mode.

5. The method of claim 1, wherein the local computing environment is performing local processing.

6. The method of claim 1, wherein the remote computing environment is automatically activated based on a close proximity connection to the at least two chosen available remote peripheral devices.

7. The method of claim 1, wherein the remote computing environment is automatically activated as a function of interaction with a docking station that has connectivity to one or more of the available remote peripheral devices.

8. The method of claim 1, wherein the remote computing environment is automatically activated as a function of a close proximity connection to a wireless hub.

9. The method of claim 1, wherein the list of the available remote peripheral devices is obtained based on a discovery process, and the discovery process is generated automatically, manually, or combinations thereof.

10. The method of claim 1, further comprising:
    monitoring availability of the at least two chosen available remote peripheral devices; and
    selectively deactivating the remote computing environment in response to the monitored availability indicating that at least one chosen remote peripheral device is no longer available.

11. A wireless communications apparatus, comprising:
    a memory that retains instructions related to
        obtaining a list of available remote peripheral devices,
        selecting two or more of the available remote peripheral devices based on a minimum required combination of the available remote peripheral devices, wherein the instructions related to selecting the two or more of the available remote peripheral devices comprise instructions related to:
            ascertaining that two or more of the available remote peripheral devices offer a similar function, and
            selecting one of the two or more available peripheral devices that offer the similar function based on conformance with a set of rules, wherein the set of rules comprises selecting a wired link over a wireless link, selecting a stronger wireless link over a weaker wireless link, or combinations thereof, and
        activating a remote computing environment, wherein the remote computing environment comprises the two or more selected available remote peripheral devices and provides a different user experience compared with a local computing environment of a mobile device; and
a processor coupled to the memory and configured to execute the instructions retained in the memory.

12. The wireless communications apparatus of claim 11, wherein the memory further retains instructions related to conveying a wake up trigger and changing a current energy state to an energy state which enables the remote computing environment after selecting the two or more available remote peripheral devices.

13. The wireless communications apparatus of claim 11, wherein the remote computing environment is automatically activated based on a close proximity connection to the two or more selected available remote peripheral devices.

14. The wireless communications apparatus of claim 11, wherein the remote computing environment is automatically activated as a function of an interaction with a docking station having connectivity to one or more of the available remote peripheral devices.

15. The wireless communications apparatus of claim 11, wherein the remote computing environment is automatically activated as a function of a close proximity connection to a wireless hub.

16. The wireless communications apparatus of claim 11, wherein the list of the available remote peripheral devices is obtained based on a discovery process that utilizes two or more protocols, wherein the discovery process is generated automatically, manually, or combinations thereof.

17. The wireless communications apparatus of claim 11, wherein the memory further retains instructions related to monitoring availability of the two or more selected available remote peripheral devices and selectively deactivating the remote computing environment in response to the monitored availability indicating that at least one selected remote peripheral device is no longer available.

18. A wireless communications apparatus that enables a remote computing environment, comprising:
  means for obtaining a list of available remote peripheral devices;
  means for selecting at least two of the available remote peripheral devices based on a minimum required combination of the available remote peripheral devices, wherein the means for selecting the at least two of the available remote peripheral devices comprises:
    means for ascertaining that two or more of the available remote peripheral devices offer a similar function; and
    means for selecting one of the two or more available peripheral devices that offer the similar function based on conformance with a set of rules, wherein the set of rules comprises selecting a wired link over a wireless link, selecting a stronger wireless link over a weaker wireless link, or combinations thereof; and
  means for activating the remote computing environment, wherein the remote computing environment comprises the at least two selected available remote peripheral devices and provides a different user experience compared with a local computing environment of a mobile device.

19. The wireless communications apparatus of claim 18, wherein the remote computing environment is automatically activated based on a close proximity connection to the at least two selected available remote peripheral devices, based on interaction with a docking station that has connectivity to one or more of the available remote peripheral devices, or based on a close proximity connection to a wireless hub.

20. A non-transitory computer-readable medium storing code that, when executed by a computer, causes the computer to:
  obtain a list of available remote peripheral devices;
  choose at least two of the available remote peripheral devices based on a minimum required combination of the available remote peripheral devices, wherein the code that causes the computer to choose the at least two of the available remote peripheral devices further causes the computer to:
    ascertain that two or more of the available remote peripheral devices offer a similar function; and
    select one of the two or more available peripheral devices that offer the similar function based on conformance with a set of rules, wherein the set of rules comprises selecting a wired link over a wireless link, selecting a stronger wireless link over a weaker wireless link, or combinations thereof; and
  activate a remote computing environment, wherein the remote computing environment comprises the at least two chosen available remote peripheral devices and provides a different user experience compared with a local computing environment of a mobile device.

21. At least one processor configured to enable a remote computing environment, comprising:
  a first module configured to obtain a list of available remote peripheral devices;
  a second module configured to choose at least two of the available remote peripheral devices based on a minimum required combination of the available remote peripheral devices, wherein the second module is further configured to:
    ascertain that two or more of the available remote peripheral devices offer a similar function; and
    select one of the two or more available peripheral devices that offer the similar function based on conformance with a set of rules, wherein the set of rules comprises selecting a wired link over a wireless link, selecting a stronger wireless link over a weaker wireless link, or combinations thereof; and
  a third module configured to activate the remote computing environment, wherein the remote computing environment comprises the at least two chosen available remote peripheral devices and provides a different user experience compared with a local computing environment of a mobile device.

22. The method of claim 1, further comprising:
aggregating information relating to different wireless protocols.

23. The wireless communications apparatus of claim 11, further comprising:
  a service discovery aggregator coupled to the processor and configured to aggregate information related to different wireless protocols.

24. The non-transitory computer-readable medium of claim 20 further storing code, that when executed by the computer, causes the computer to selectively deactivate the remote computing environment based on connectivity of the at least two chosen available remote peripheral devices.

25. The processor of claim 21, wherein the processor further comprises a fourth module configured to selectively deactivate the remote computing environment based on connectivity of the at least two chosen available remote peripheral devices.

26. The wireless communications apparatus of claim 11, wherein the processor is integrated with the mobile device.

27. The wireless communications apparatus of claim 18, wherein the means for selecting is integrated with the mobile device.

28. The non-transitory computer-readable medium of claim 20, wherein the non-transitory computer-readable medium is integrated with the mobile device.

29. The at least one processor of claim 21, wherein at least the second module is integrated with the mobile device.

30. The non-transitory computer-readable medium of claim 20 further storing code that, when executed by the computer, causes the computer to monitor availability of the at least two chosen available remote peripheral devices and selectively deactivate the remote computing environment in response to the monitored availability indicating that at least one chosen remote peripheral device is no longer available.

31. The at least one processor of claim 21, wherein the processor further comprises a fourth module configured to monitor availability of the at least two chosen available remote peripheral devices and selectively deactivate the remote computing environment in response to the monitored availability indicating that if at least one chosen remote peripheral device is no longer available.

32. The at least one processor of claim 21, wherein the remote computing environment is activated at a same time as the local computing environment.

33. The method of claim 1, wherein the at least two of the available remote peripheral devices are chosen as a function of availability of at least a minimum number of devices.

34. The method of claim 1, wherein the minimum required combination of the available remote peripheral devices comprises one keyboard, one mouse, and one display.

\* \* \* \* \*